June 21, 1966  J. V. BAUER  3,256,866
INTERNAL COMBUSTION ENGINE
Filed Sept. 21, 1962                                    5 Sheets-Sheet 1

FIG. I

INVENTOR:
JORDAN V. BAUER
BY
ATT'YS

INVENTOR:
JORDAN V. BAUER

INVENTOR:
JORDAN V. BAUER

June 21, 1966  J. V. BAUER  3,256,866
INTERNAL COMBUSTION ENGINE
Filed Sept. 21, 1962  5 Sheets-Sheet 5
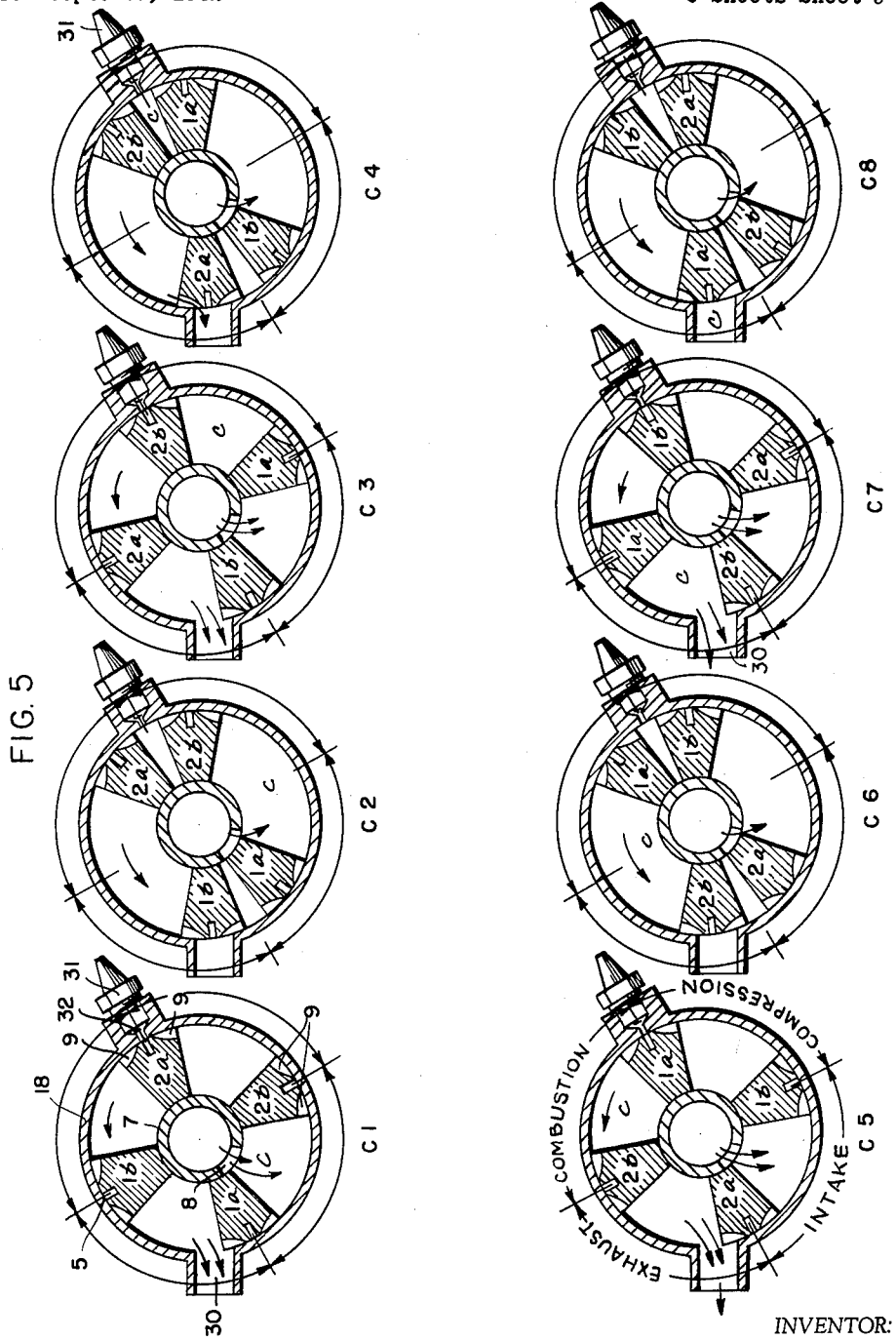
FIG. 5
INVENTOR:
JORDAN V. BAUER
BY 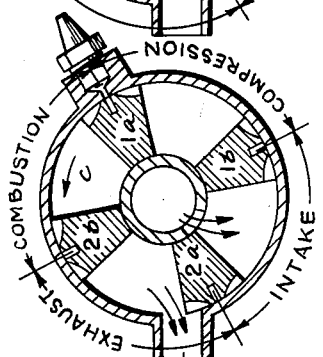
ATT'YS 3,256,866
INTERNAL COMBUSTION ENGINE
Jordan V. Bauer, 1001 Grand Ave., Keokuk, Iowa
Filed Sept. 21, 1962, Ser. No. 225,314
4 Claims. (Cl. 123—11)

This invention relates to a new rotary-type combustion engine. At present, only multi-cylinder internal combustion engines using reciprocating pistons have proved to be most practical and efficient for automobile or other uses requiring a smooth flow of power throughout a variable speed range. Multi-cylinder reciprocating engines, however, do have several disadvantages. It is not possible to completely balance the reciprocating pistons so as to eliminate vibration. Furthermore, the valve and ignition mechanisms involve numerous moving parts and intake and exhaust manifolding becomes quite complicated.

An object of my invention is to produce an improved rotary engine which will have the favorable performance features of the multi-cylinder reciprocating engine but which will be completely balanced dynamically and which will be much more simple in construction and operation.

Numerous rotary-type engines have been previously proposed but for various reasons none of these designs has seriously displaced the conventional reciprocating engine for most purposes. I believe my invention presents a new approach in rotary engines which is superior to previous rotary engines and offers great advantages over the reciprocating engine.

My new engine is of the positive displacement four-cycle type, but instead of reciprocating pistons, it features the use of a rotary-sector type of piston mechanism which performs the required functions of intake compression, combustion and exhaust by rotating differentially in a cylindrical combustion chamber.

In general, my new internal combustion engine comprises (a) a cylindrical housing which functions as a combustion chamber; (b) two pairs of sector-shaped vanes which are centrally mounted in the cylindrical housing and so sealed that the four air spaces or chambers between the pairs of vanes are closely confined; (c) means whereby the pairs of vanes are rotated differentially in such a manner that the four air spaces confined between the vanes are alternately expanded and compressed as the vanes rotate; (d) means of introducing a fuel and air mixture consecutively into the air spaces so as to perform the function of intake; (e) means of igniting the sequence of compressed fuel charges to produce a series of power impulses; (f) means of exhausting the combustion products from the engine; (g) means whereby the differential rotation of the vanes, as induced by the expansion of the burning fuel charges, drives a power output shaft.

The best mode contemplated for the practice of my invention comprises the use of two matching cylindrically shaped rotors, each rotor having a pair of balanced sector-type vanes of about 30 to 45 degrees arc, preferably 30 to 40 degrees, and spaced 180° apart. These vanes extend from one end of the rotor whereas the opposite end of the rotor unit is constructed to form a gear. Each rotor unit has a hole running through the center which permits the two units to be mounted on a hollow spindle shaft so that the vanes intermesh, but each is free to rotate through a substantial angle with relation to the other. The rotor and spindle assembly is closely fitted into an open-ended cylindrical housing which functions as the combustion chamber. Seals are provided so that although the rotors are free to rotate within the cylinder the four air spaces between the rotor vanes are confined. The geared ends of the rotors project beyond the ends of the cylindrical housing so as to provide means for driving the rotors. The hollow spindle shaft on which the rotors revolve is fastened so as to remain stationary, and in addition to acting as a bearing for the rotors it also functions as the intake manifold of the engine. This is an important feature of my engine in that it presents a practical method of dissipating excessive heat from the rotors and rotor bearings.

The gear end of each rotor is coupled to a common power output shaft by means of a gear and an eccentric crank mechanism. Devices of this nature, wherein two cranks with their axes parallel but out of line (eccentric) are coupled by a link, roller cam follower or other equivalent means, will transform a uniform rotary motion into an alternating fast and slow rotary motion. To obtain a differential movement between the two rotors their respective crank mechanisms are arranged to be 180° out of phase. Therefore, when the power output shaft is rotated the two rotor units are constrained to rotate differentially. Conversely, a differential rotation of the two rotor units will impel the power output shaft to rotate. By this means the four air spaces confined between the pairs of vanes are alternately subjected to compression and expansion as they are carried around the inner circumference of the cylinder by the differentially rotating vanes. The pitch diameter of the gears used to couple the rotor gears to their respective crank mechanisms are one-half the pitch diameter of the rotor gears. This is done so that two fluctuations in the differential rotation of the rotors will take place in 360° of revolution. This is necessary in order that a four-cycle mode of operation is obtained, with each cycle taking place at fixed 90° intervals around the 360° circumference of the combustion chamber. As a result of this construction the function of intake is accomplished by locating an intake port in the wall of the hollow spindle shaft at the location where the intake cycle takes place. The function of exhaust is likewise obtained by placing an exhaust port in the wall of the cylindrical combustion chamber at the location where the exhaust cycle takes place. The opening and closing of these ports in the proper sequence is obtained as they are exposed or covered by the movement of the differentially rotating rotor vanes. Likewise, the cycles of compression and combustion take place in their predetermined, respective areas around the circumference of the chamber. Ignition of the compressed charge is accomplished by a spark plug or other ignition device located in the cylinder wall at the combustion area.

Inasmuch as the four air spaces confined between the vanes are each expanded and compressed two times during each 360° of rotation, a four cycle mode of operation is obtained so as to produce four power impulses for each revolution of the rotor assembly. This is equivalent to the frequency of power impulses obtained with an eight cylinder, four cycle reciprocating engine.

The operation of the engine as a source of power is as follows: The power output shaft is rotated to actuate the rotor assembly. As the rotor assembly turns, the differential rotation of the rotor vanes acts to alternately expand and compress the air space confined between the vanes. This action draws the fuel and air mixture through the intake port into the cylinder where it is trapped between the vanes and carried one-half revolution around the circumference of the cylinder as it is being compressed. At the point of highest compression, the charge is ignited by the spark plug located in the combustion area and exerts its force on the vanes as it travels another one-half revolution around the circumference and passes out through the exhaust port. After the initial combustion, the subsequent series of power impulses will continue to drive the rotor assembly which in turn drives the output shaft.

A primary object of my rotary engine design is to avoid the vibration that is inherent to reciprocating mechanisms. All of the moving parts of my engine are rotational in character and therefore can readily be both statically and dynamically balanced. Another important feature of my engine design is its simplicity of construction, and the fewer number of moving parts as compared to multi-cylinder reciprocating engines.

In my engine the four operating cycles of intake, compression, combustion, and exhaust take place in a single cylindrical chamber or housing with a single ignition point and combustion area. Only one intake port and one exhaust port are needed, yet four power impulses are produced with each revolution of the rotor assembly. The functional simplicity achieved by my method of construction will be apparent by comparison with the complexity of an eight-cylinder reciprocating engine. For example, no elaborate manifolding or complicated valve mechanism is required. Carburation or fuel injection and ignition timing are greatly simplified. Greater volumetric and thermal efficiency is obtained because of a lesser area of radiating surface per volume of displacement. Larger unrestricted intake and exhaust ports may be used than is practical with reciprocating engine design.

It will be apparent to those familiar with internal combustion engine design that although the comments and description herein are directed to an engine of the gasoline burning type, the same concept is adaptable to a diesel type of combustion by using a higher compression and injecting the fuel into the compressed air charge at the combustion area of the cylinder.

My invention is further illustrated by accompanying drawings and descriptions showing a specific example of preferred construction of my new engine and the functions of its component parts.

In the drawings:

FIGURE 5 is a series of diagrams showing the various positions of the rotor vanes in relation to the intake and exhaust ports and spark plug during the functions of intake, compression, combustion and exhaust.

Figure 1:
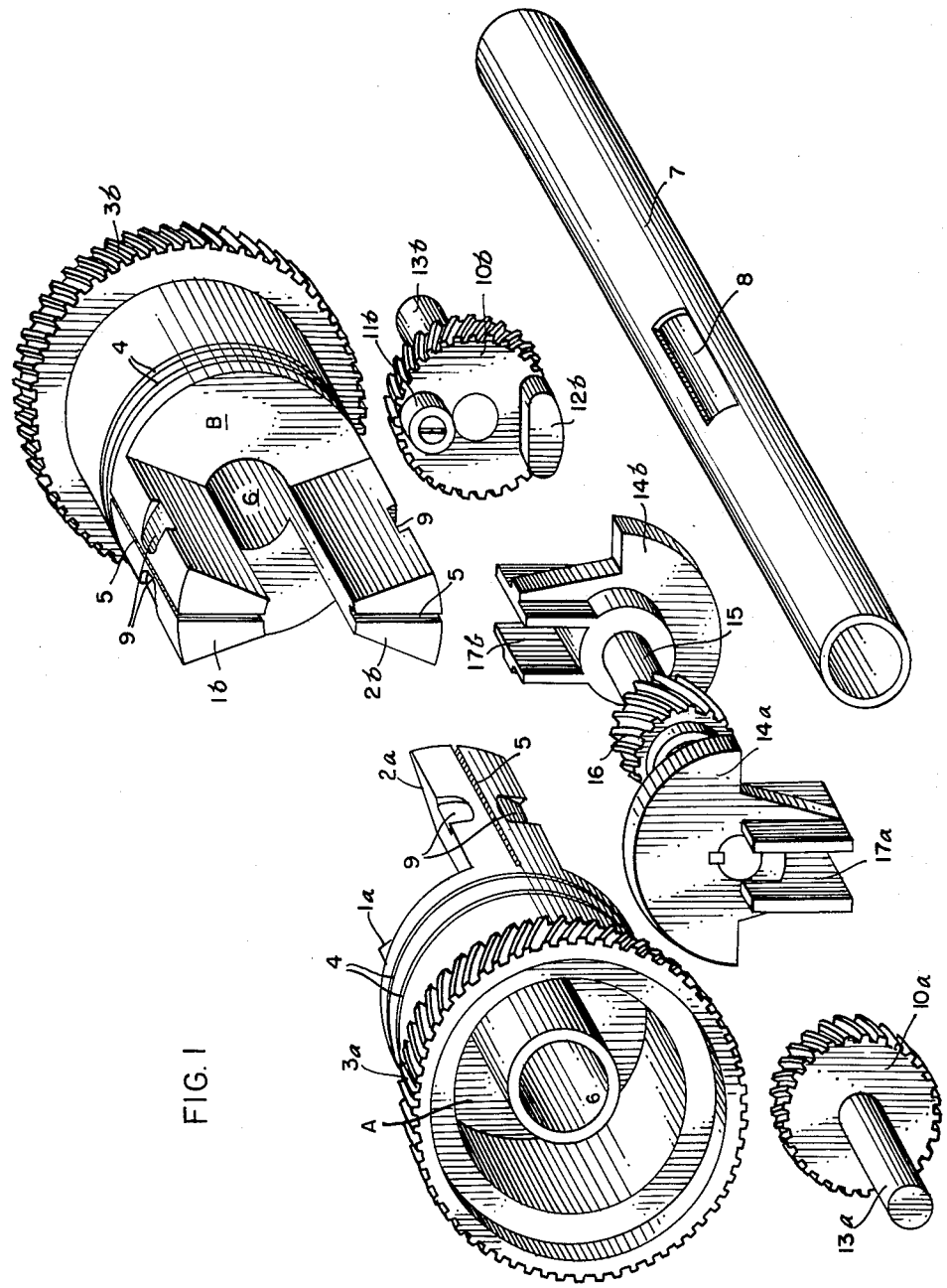
FIGURE 1 is an exploded perspective view of the rotary sector type "piston" assembly showing the two rotors, the rotor spindle shaft with gears and eccentric crank mechanism.

In FIGURE 1 the two matched rotors are indicated by the letters A and B. Each rotor has a balanced pair of sector-shaped vanes of about 30 degree to 45 degree arc, spaced 180 degrees apart. These vanes are indicated in this drawing by the numbers 1a, 2a, 1b and 2b. The opposite ends of the rotors are constructed in the form of a gear as indicated by the numbers 3a and 3b. Piston ring type seals 4, are used to seal the circumference of the rotors, whereas blade type seals 5, are used to seal each of the vanes. The blades 5 are preferably spring-loaded so as to assure sealing contact with the combustion cylinder walls and the face of the opposite rotor. A hole 6 is bored through each rotor which permits it to be mounted on the hollow shaft 7. This shaft, which is stationary, functions as a spindle bearing for the rotors and also serves as the intake manifold of the engine. The intake port in the shaft is indicated by the number 8. The hollowed-out areas 9 in peripheral portions of each of the rotor vanes are for the purpose of improving the scavenging of the ignition area of the combustion cylinder when the engine is operating.

The two gears indicated by the numbers 10a and 10b are one-half the pitch diameter of the rotor gears 3a and 3b. Each of the gears 10a and 10b is fitted with a roller type "wrist pin" or cam follower, 11a and 11b, as illustrated in the drawing. The gears are fastened to shafts, 13a and 13b, so that they can be supported by bearings. Counterweights 12a and 12b are fitted to the gears so they will be in dynamic balance. In use, each of these gear assemblies plays a dual roll as a combination gear and crank.

The tooth form of both the rotor gears 3a and 3b, and the crank gears 10a and 10b should preferably be of the helical type and the "hand" should be such that the end thrust of the gear combinations will oppose the lateral outward thrust of the rotors when the engine is operating.

The two slotted cranks 14a and 14b shown in the drawing are keyed to the crank shaft 15, which is fitted with a helical power transfer gear 16. Both cranks are constructed so as to be dynamically balanced. The channels of slots 17a and 17b in the cranks 14a and 14b are of such width as to provide a sliding fit for the roller cam followers 11a and 11b.

When the components shown in FIGURE 1 are assembled, the two rotors A and B are mounted on the spindle shaft 7, with their vanes intermeshed. The gears 10a and 10b are meshed with corresponding rotor gears 3a and 3b and are supported concentrically on bearings with a common axis parallel to that of the spindle shaft 7. The roller cam followers 11a and 11b are engaged in the slots 17a and 17b of the cranks 14a and 14b. The crank shaft 15 is mounted on bearings with its axis parallel, but eccentric to that of the gears 10a and 10b. Because of this eccentricity a uniform rotation of crank shaft 15 will impel a cyclic differential rotation of the gears 10a and 10b, with each of the two gears alternately speeding up and slowing down once each revolution. Conversely, a cyclic differential rotation of the gears 10a and 10b will impel a uniform rate of rotation to the crank shaft 15.

The rotor gears 3a and 3b are constructed to have twice the pitch diameter of gears 10a and 10b. This is done so that two fluctuations in the differential rotation of the rotors will take place in 360° of rotation rather than only one, thus making a four-cycle mode of operation possible.

It will be noted in the drawing that the cranks 14a and 14b are mounted to be 180° out of phase. This is done so that the differential rotation of gears 10a and 10b will also be 180° out of phase. Thus when gear 10a for example, is slowing down, gear 10b will be speeding up, and vice versa.

The result of this arrangement is that the rotors A and B are impelled to rotate differentially and the space between the rotor vanes will open and close as the vanes alternately catch up and pull away from each other. Furthermore, these cycles will take place at fixed locations 90 degrees apart in 360 degrees of rotation.

Instead of the eccentric crank mechanism with slotted-type cranks that is illustrated in the drawing, an eccentric crank device using a crank and connecting link mechanism could also be used but is less desirable for the purposes of this invention. Other variations of design would likewise be permissible if equivalent in effect. It is therefore not my intention to limit the broader aspects of my invention to the specific crank device herein illustrated.

Change of motion mechanisms of this nature are well-known mechanical movements and, thus, while not necessarily novel in themselves, do produce when combined with the other components of the invention a novel desirable result.

With eccentric crank mechanisms the amplitude of the differential movement is determined by the extent the respective crank shafts are out of line. As the degree of eccentricity is increased or decreased, the amplitude of the differential movement is increased or decreased. Practical mechanical considerations, however, limit the maximum amplitude that can be effectively used.

In my engine design using the type of mechanism illustrated an angular differential in rotation, between the two rotors A and B, of 90 degrees to 100 degrees would be good practice. A lesser amplitude would lower the effective displacement of the engine but may be desirable if the engine design is modified for a diesel type of operation.

Figure 2:
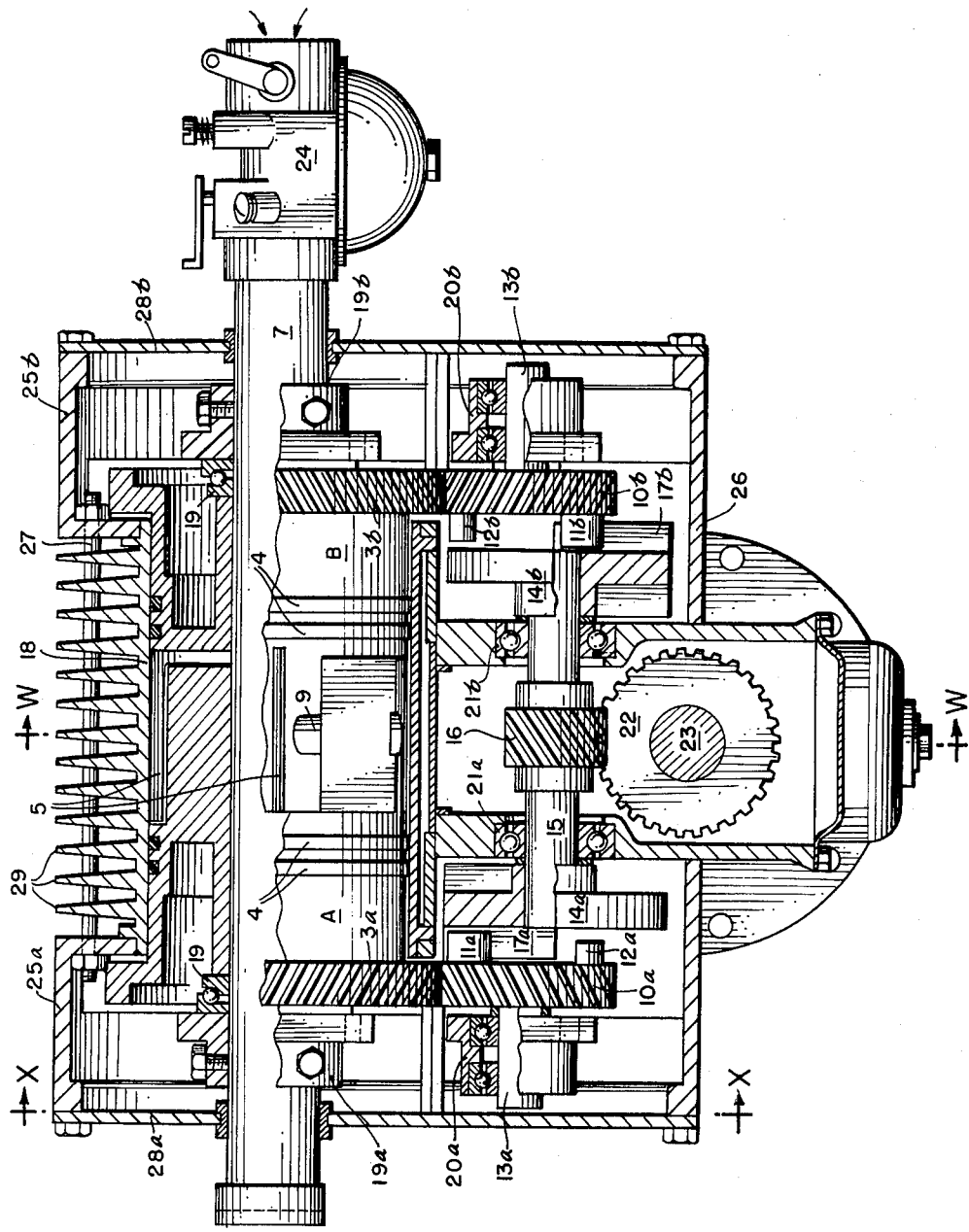
FIGURE 2 shows a front elevation of the assembled engine in partial cross section taken along the line Y—Y of FIGURE 3, looking in the direction of the arrows.
Figure 3:
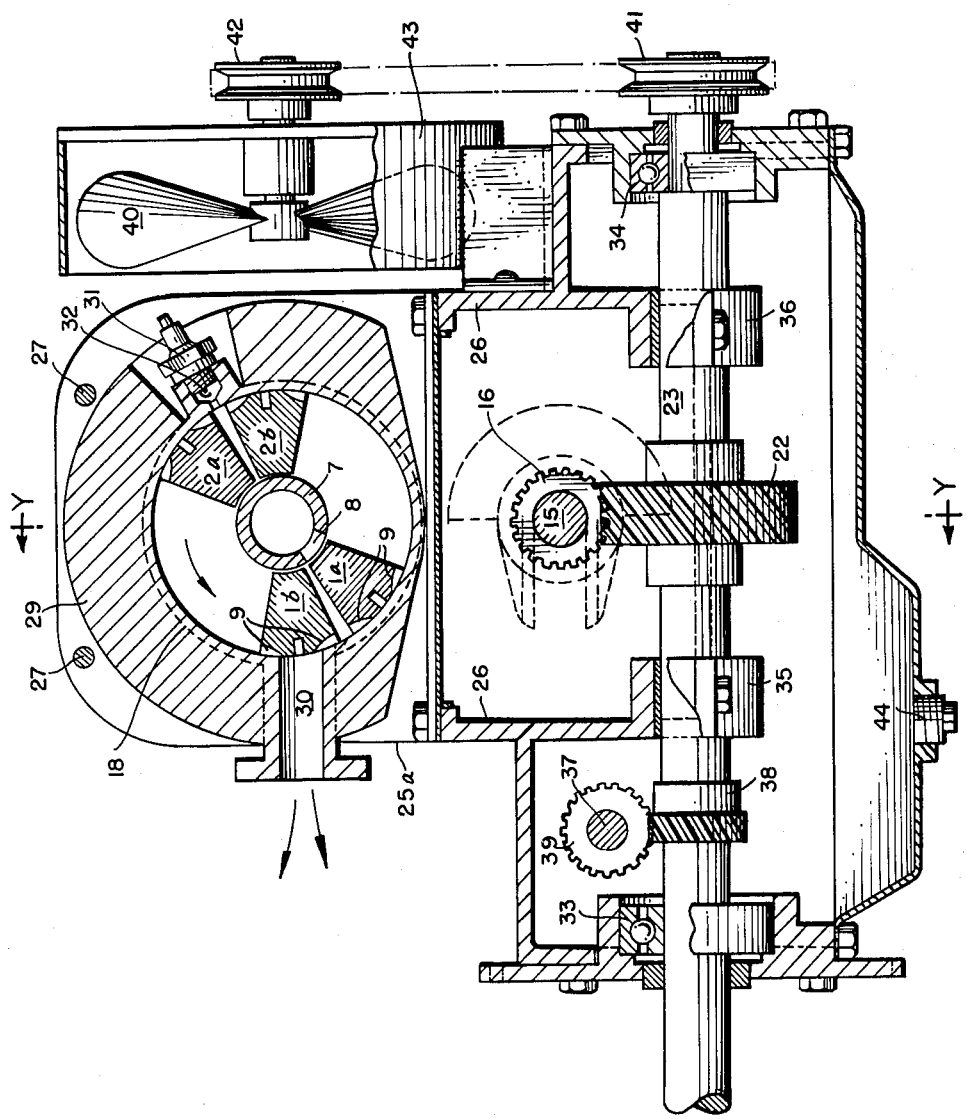
FIGURE 3 shows a side elevation of the engine in partial cross section taken along the line W—W of FIGURE 2, looking in the direction of the arrows.

FIGURE 2 shows a front elevation of the assembled engine in partial cross section taken through the center of the combustion cylinder and rotor assembly (indicated by line Y—Y of FIG. 3).

This drawing shows the two rotors A and B as mounted on the spindle shaft 7 and centered in the cylindrical combustion chamber 18. The rotors A and B are free to rotate on the shaft 7, but are held in position laterally by thrust bearings 19a and 19b. The spindle shaft 7 is held stationary and is centered in the combustion cylinder 18 by yoke and collar arrangements 19a and 19b. Gears 10a and 10b on their respective shafts 13a and 13b are supported by bearings 20a and 20b. The gear cam followers 11a and 11b, are engaged in the slots 17a and 17b of the cranks 14a and 14b. The slotted crank assembly comprising cranks 14a and 14b with crank shaft 15 and power transfer gear 16 is supported by bearings 21a and 21b with its axis parallel, but eccentric, to the axis of gear shafts 13a and 13b. Gear 16 is a 45 degree helical gear and is meshed with the helical power shaft gear 22. The power shaft 23 is at right angle to the crank shaft 15.

The spindle shaft 7 is hollow and also functions as the intake manifold of the engine. The manifold may be fed by a single carburetor 24, as illustrated, or if desired two carburetors may be used, one at each end of the hollow shaft 7. The combustion cylinder 18 in which the rotors are centered is held in place by two cylinder support housings 25a and 25b, which in turn are bolted to the lower crank case housing 26. Two tie rods 27 serve to reinforce the structure. Cover plates 28a and 28b serve to enclose the rotor and gear mechanism and prevent the loss of lubricating oil. The cooling fins 29 on the combustion cylinder 18 are for the purpose of air cooling the cylinder.

FIGURE 3 shows a side elevation of the engine in partial cross section, taken through the center of the cylinder combustion area (indicated by line W—W of FIGURE 2). This drawing shows the rotor vanes 1a, 2a, 1b and 2b in cross section with relation to the location of the intake port 8 in the manifold shaft 7, the exhaust port 30 and spark plug 31. The vanes are in the position they would be in at the time of ignition. It will be apparent from this drawing how the hollow spindle shaft 7 functions as the intake manifold and feeds the fuel-air mixture into the cylinder by way of intake port 8. As the vanes rotate differentially, the intake and exhaust ports are covered and uncovered by the movement of the rotor vanes in such sequence as to properly perform their functions. The hollowed-out areas 9 in the edges of the vanes are for the purpose of obtaining better scavenging of the spark plug ignition cavity 32.

This drawing also shows how the helical power-transfer gear 16 drives the power shaft 23 by way of helical gear 22. The power shaft 23 is supported by ball bearings 33 and 34 and plain bearings 35 and 36. An auxiliary drive shaft 37 is driven by the power shaft 23 through helical gears 38 and 39. This auxiliary drive shaft is used to drive the ignition timing mechanism and an externally mounted oil pump, not shown. Details of these auxiliary parts are not illustrated as they would be of a conventional nature well known to the art.

A fan for the purpose of cooling the finned combustion cylinder 18 is indicated by the number 40. It is driven by the power shaft 23, by means of V-belt pulleys 41 and 42. The fan 40 is mounted as illustrated in a housing 43 which is fastened to the crank case housing 26 of the engine. The oil pan of the engine is indicated by the number 44. Details of the lubrication system are not illustrated in the drawings as it would be of a conventional nature. The rotors may be lubricated either by a force-feed oiling system or, if desired, by using oil in the gasoline as is the practice with two-cycle engines.

Figure 4:
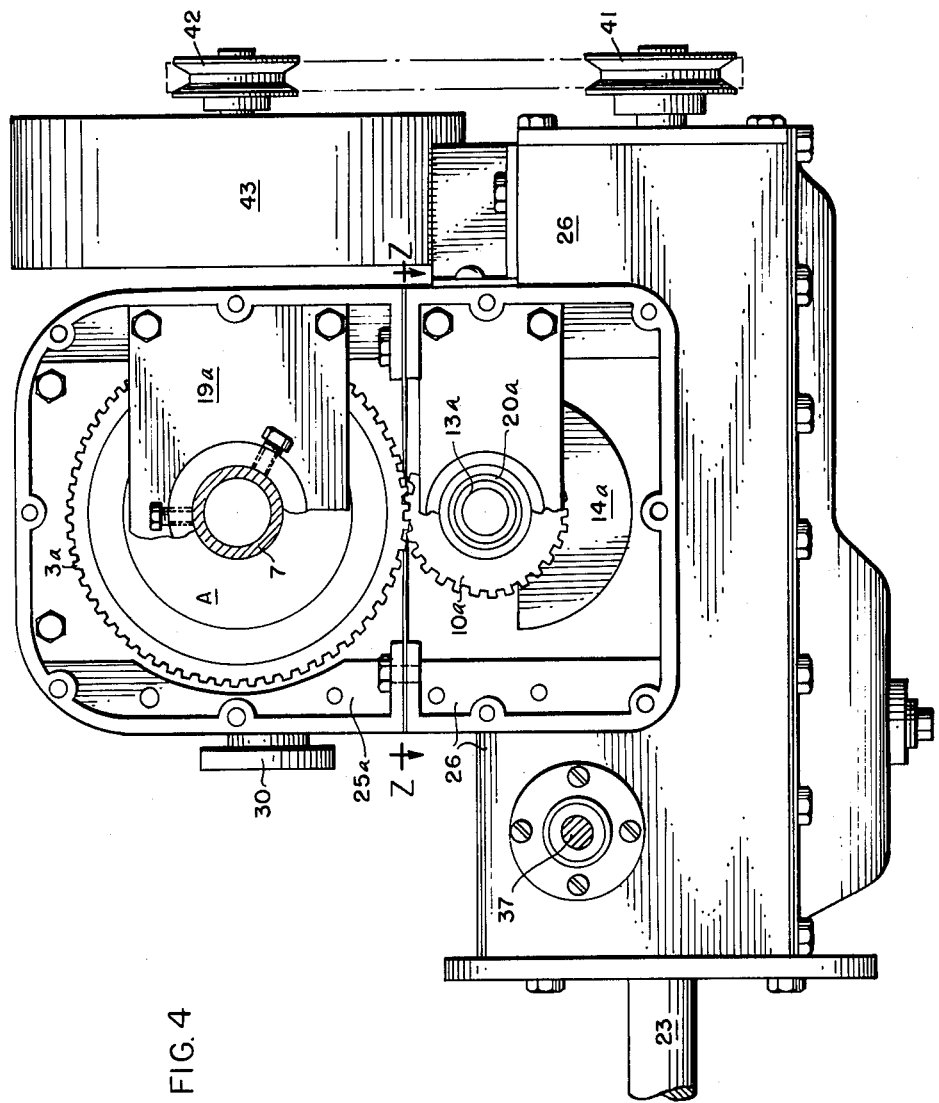
FIGURE 4, is also a side elevation of the engine in partial cross section taken along the line X—X of FIGURE 2, looking in the direction of the arrows.

FIGURE 4 is a side elevation of the engine with the cover plate 28a removed (indicated by line X—X on FIGURE 2). This drawing shows the rotor gear 3a in mesh with the crank gear 10a and a partial view of the slotted crank 14a. It illustrates how the spindle shaft (and intake manifold) 7 is supported and centered in the cylinder support housing 25a. It also shows how the cylinder support housing is bolted to the lower crank case housing at the junction line Z—Z. The auxiliary drive shaft 37 extends through the crank case housing 26, so that one end may be used to drive the ignition timing mechanism and the other end to drive an externally mounted oil pump.

FIGURE 5 shows a series of diagrams illustrating the differential movement of the rotor vanes in performing the functions of intake, compression, combustion, and exhaust. Although actually four fuel charges are drawn into the combustion cylinder and burned during each 360 degrees of revolution of the rotors, only a single charge will be traced through the four cycles, in this illustration, in order to avoid confusion. Diagram C1 shows combustion cylinder 18 with intake manifold 7 and intake port 8 along with exhaust port 30 and spark plug 31. The blade-type vane seals are indicated by the number 5 and the hollowed-out areas on the vanes by the number 9. The spark plug ignition cavity is designated by the number 32.

The single fuel charge to be followed through the four cycles is identified by the letter C. Diagrams C1 and C2 show the charge C as it is drawn into the combustion cylinder as vanes 1a and 2b move apart. It is then compressed as shown in diagram C3 as the vanes 1a and 2b come together. In diagram C4 the charge C has reached its maximum compression and is ignited by the spark plug 31. Diagram C5 shows the burning charge C as it forces the vanes 1a and 2b apart. Diagram C6 shows the charge C as it reaches the end of the "power stroke." Diagrams C7 and C8 show the burned charge C as it is discharged through the exhaust port 30.

For the purpose of illustrating my invention I have presented a specific example of construction wherein the engine is of an air-cooled design. It will be obvious to those familiar with machine design that the engine could be adapted to water cooling if so desired.

For example, the fuel intake port 8 can be placed in the wall of combustion cylinder 18 at a point corresponding to the position it occupies in tube 7 and water, diethylene glycol, or other coolant can be circulated through tube 7. However, when the fuel is introduced through port 8 in tube 7, the fuel also acts as a coolant. Likewise, other modifications can be made, such as the use of fuel injection instead of a carburetor, or a diesel type of operation.

One of the unique features of the present invention resides in the fact that each pair of vanes is driven at a variable speed. Furthermore, both rotors rotate about a single fixed shaft. A simple cam mechanism is used to control the variable speed of the rotors and vanes. I have heretofore considered mounting the vanes on concentric shafts. It has also been proposed to mount the vanes in this manner and to drive one pair of vanes at a constant speed and the other pair of vanes at a variable speed. This requires that the vanes be formed from wide sector shaped pieces and that they be driven through a wide angle. Wide sectors reduce displacement. A sun gear and levers connected to a smaller gear rotating around the sun gear can be used to control the variable speed vanes but the mechanism is fairly cumbersome and not so compact as my mechanism, nor does this type of structure as a whole lend itself to the best cooling which is essential for satisfactory operation over long periods of time.

The invention is hereby claimed as follows:

1. A four cycle rotary internal combustion engine comprising:

(a) a housing with a cylindrical chamber open at both ends, (b) a hollow cylindrical shaft fixedly and concentrically positioned in the cylindrical chamber of housing (a),
(c) two matching cylindrical rotors, each rotor being of such external diameter as to have a close but non-binding fit in said cylindrical chamber of housing (a), and each rotor being centrally bored to have a close but non-binding fit on hollow shaft (b), said rotors each having a pair of sector-type vanes spaced 180° apart extending axially from one end of the rotor, and the other end of the rotor being constructed in the form of a gear, said rotors being assembled on the hollow shaft (b) so as to rotate in the cylindrical chamber of housing (a) with the vanes of the respecitive rotors intermeshing and the geared ends of the rotors protruding beyond the open ends of said cylindrical chamber, said vanes of each rotor extending to contact the inner transverse surface of the opposite rotor, said rotors and vanes having circumferential and longitudinal seals whereby the spaces between the pairs of vanes are hermetically confined and the cylindrical bodies of the rotors act as closures for the open ends of said cylindrical chamber,
(d) means to hold said rotors (c) in lateral position,
(e) means to cause said rotors to rotate continuously and at varying speeds with respect to one another in such manner that the four air spaces confined between said rotor vanes are alternately expanded and compressed in such sequence that a four cycle mode of operation is obtained, said means comprising the geared ends of the two rotors (c) each being in mesh with a gear of one-half the pitch diameter of the rotor gear, said smaller gears each being coupled by way of an eccentric mechanism to a power output shaft, whereby rotation of said power output shaft impels a differential cyclic variation in the speed of rotation of the two rotors, and conversely the differential rotation of the two rotors as induced by expansion of the burning fuel charges impels rotation of the power output shaft of the engine,
(f) means to introduce fuel and air into said spaces between said rotor vanes in proper sequence,
(g) means to ignite said fuel and air charges in proper sequence to produce a source of power impulses,
(h) means to exhaust the combustion products of said engine, and
(i) means to cause the differential rotation of said rotors as induced by the expansion of the burning fuel charges to drive a power output shaft of said engine.

2. A four cycle rotary internal combustion engine comprising:
(a) a housing with a cylindrical chamber open at both ends,
(b) a hollow cylindrical shaft fixedly and concentrically positioned in the cylindrical chamber of housing (a),
(c) two matching cylindrical rotors, each rotor being of such external diameter as to have a close but non-binding fit in said cylindrical chamber of housing (a), and each rotor being centrally bored to have a close but non-binding fit on hollow shaft (b), said rotors each having a pair of sector-type vanes spaced 180° apart extending axially from one end of the rotor, and the other end of the rotor being constructed in the form of a gear, said rotors being assembled on the hollow shaft (b) so as to rotate in the cylindrical chamber of housing (a) with the vanes of the respective rotors intermeshing and the geared ends of the rotors protruding beyond the open ends of said cylindrical chamber, said vanes of each rotor extending to contact the inner transverse surface of the opposite rotor, said rotors and vanes having circumferential and longitudinal seals whereby the spaces between the pairs of vanes are hermetically confined and the cylindrical bodies of the rotors act as closures for the open ends of said cylindrical chamber,
(d) means to hold said rotors (c) in lateral position,
(e) means to cause said rotors to rotate continuously and at varying speeds with respect to one another in such manner that the four air spaces confined between said rotor vanes are alternately expanded and compressed in such sequence that a four cycle mode of operation is obtained, the geared ends of the two rotors (c) each being in mesh with a gear of one-half the pitch diameter of the rotor gear, said smaller gears each being coupled by way of an eccentric crank and slotted cam mechansim to the power output shaft of the engine,
(f) means to introduce fuel and air into said spaces between said rotor vanes in proper sequence,
(g) means to ignite said fuel and air charges in proper sequence to produce a source of power impulses,
(h) means to exhaust the combustion products of said engine, and
(i) means to cause the differential rotation of said rotors as induced by the expansion of the burning fuel charges to drive a power output shaft of said engine.

3. An internal combustion engine comprising
(a) a cylindrical housing,
(b) two pairs of sector-shaped vanes centrally mounted in said cylindrical housing and sealed in such manner that the four air spaces between the vanes are confined,
(c) means by which the pairs of vanes are constructed to rotate differentially in such manner that the four air spaces confined between the vanes are alternately expanded and compressed as the vanes rotate,
(d) means of consecutively introducing a fuel and air mixture into the said air spaces so as to perform the functions of fuel intake,
(e) means of igniting the compressed fuel charge in proper sequence to produce a series of power impulses,
(f) means of exhausting the combustion products from the engine, and
(g) a first pair of gears outside of said cylindrical chamber, each mounted for rotation to drive a pair of said sector-shaped vanes (b), a second pair of gears each drivingly connected to one of said first pair of gears, said second pair of gears each being mounted for rotation on a shaft outside of said cylindrical chamber and eccentric means eccentrically connecting each of said second gears in different predetermined positions to a rotating power takeoff whereby when said power takeoff is rotating at a constant speed said vanes are rotating at continuously varying speeds during each cycle of rotation.

4. An engine as claimed in claim 3 in which said eccentric means comprises a cam roller and a track for said roller off center with respect to said power takeoff, one being mounted on each said second gear and the other being mounted on a rotating crank fixed to a shaft on which the power takeoff is mounted.

References Cited by the Examiner

UNITED STATES PATENTS

| 1,348,675 | 8/1920  | Weed _____ 123—11 |
| 1,497,481 | 6/1924  | Bullington _____ 123—11 |
| 2,108,385 | 2/1938  | Murakami _____ 123—11 |
| 3,112,062 | 11/1963 | Way _____ 230—144 X |

FOREIGN PATENTS

| 822,397   | 9/1937  | France. |
| 1,055,004 | 10/1953 | France. |
| 1,232,505 | 4/1960  | France. |
| 167,480   | 1923    | Great Britain. |

SAMUEL LEVINE, *Primary Examiner.*

JOSEPH H. BRANSON, Jr., KARL J. ALBRECHT,
*Examiners.*